United States Patent [19]

Lowther

[11] 4,230,075
[45] Oct. 28, 1980

[54] INTERNAL COMBUSTION ENGINE

[75] Inventor: Frank E. Lowther, Buffalo, N.Y.

[73] Assignee: Purification Sciences Inc., Geneva, N.Y.

[21] Appl. No.: 972,786

[22] Filed: Dec. 26, 1978

Related U.S. Application Data

[63] Continuation-in-part of Ser. No. 955,895, Oct. 30, 1978, Ser. No. 955,896, Oct. 30, 1978, Ser. No. 926,237, Jul. 20, 1978, Ser. No. 947,998, Oct. 2, 1978, and Ser. No. 970,320, Dec. 18, 1978.

[51] Int. Cl.³ .......................... F02B 33/00; F02B 75/00
[52] U.S. Cl. .......................................... 123/68; 123/39
[58] Field of Search ........................ 123/68, 39, 27 A

[56] References Cited

U.S. PATENT DOCUMENTS

| | | | |
|---|---|---|---|
| 1,821,662 | 9/1931 | Muller | 123/27 A X |
| 1,904,070 | 4/1933 | Morgan | 123/27 A X |
| 2,126,483 | 8/1938 | O'Range | 123/27 R |
| 2,239,922 | 4/1941 | Kiener | 123/68 |
| 3,143,103 | 8/1964 | Zuhn | 123/119 C |
| 3,148,668 | 9/1964 | Bianchi | 123/68 X |
| 3,408,811 | 11/1968 | Wisehart | 60/597 |
| 3,990,421 | 11/1976 | Grainger | 123/122 D |
| 4,040,400 | 8/1977 | Martinka | 60/597 |
| 4,077,219 | 3/1978 | Melchoir | 60/599 |
| 4,103,656 | 8/1978 | Reddekopp | 123/122 D |

Primary Examiner—Wendell E. Burns

[57] ABSTRACT

An internal combustion engine method and apparatus wherein most or all of the air compression required for combustion is done outside of the internal combustion engine and out of heat exchange contact with the combustion chamber. The engine includes direct regeneration of exhaust heat and the compressor includes means for varying the compression ratio thereof in response to various parameters such as throttle demand and ambient temperature. Fuel injection and/or carburetion are used in various combinations with the compressor, and pulsed compressed air is fed from the compressor into the combustion chamber in matched relationship to the position of the piston in the cylinder.

8 Claims, 37 Drawing Figures

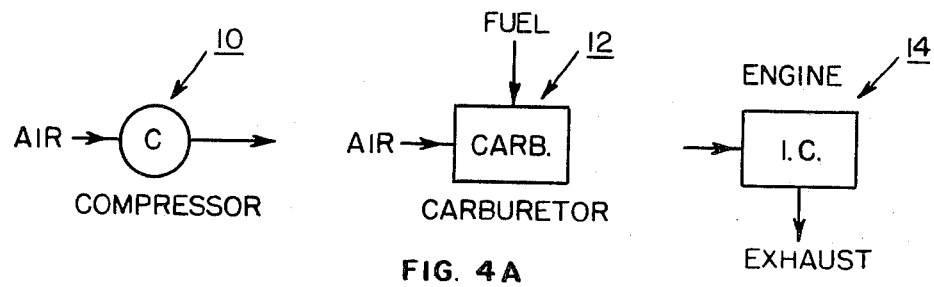
FIG. 4A
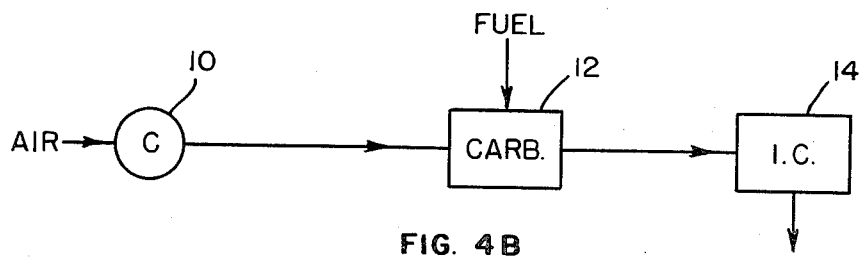
FIG. 4B
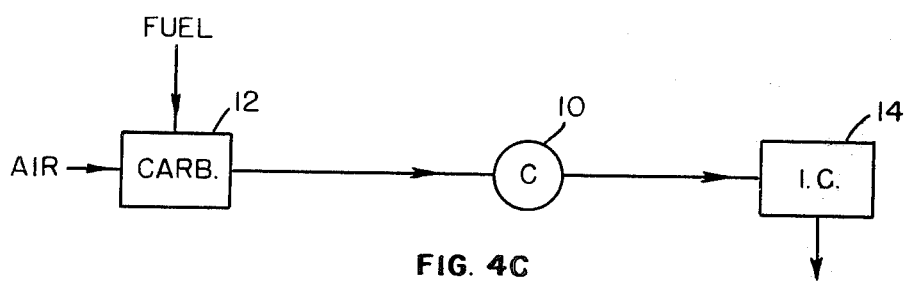
FIG. 4C
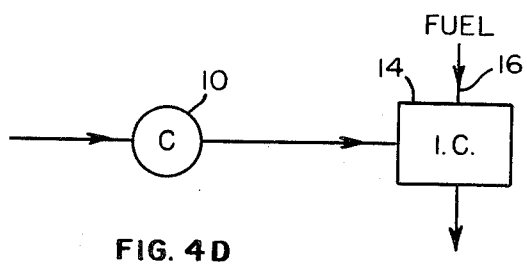
FIG. 4D
FIG. 4

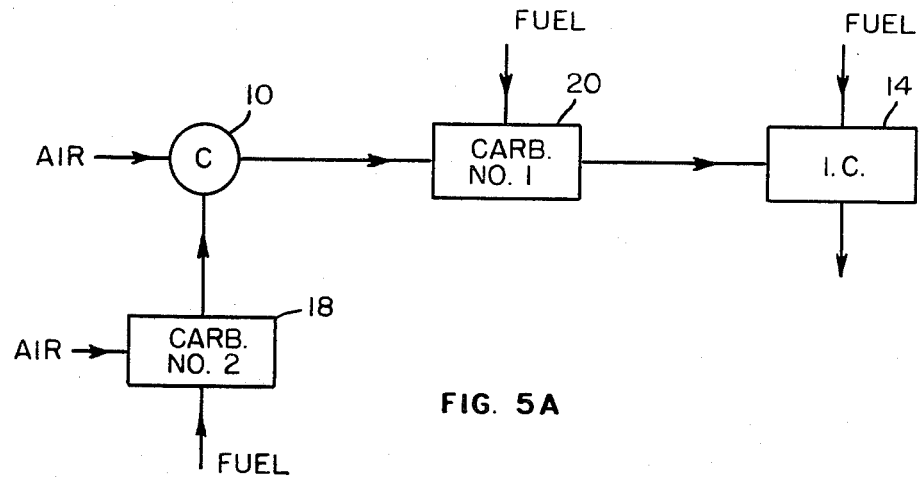
FIG. 5A
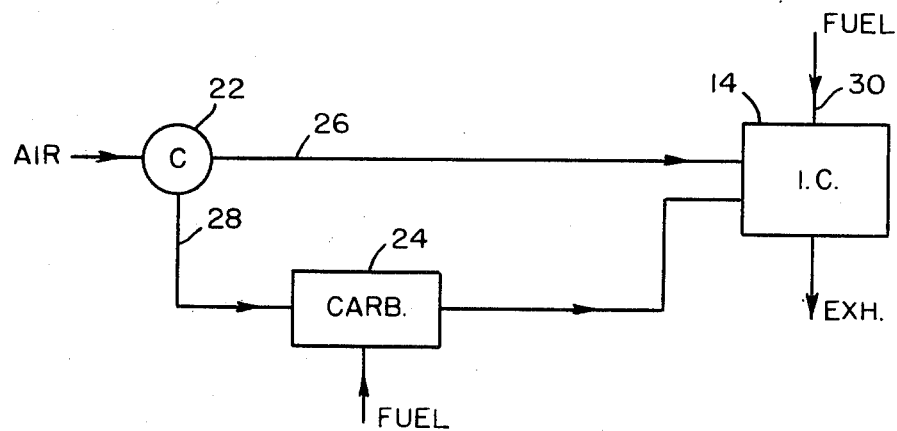
FIG. 5B
FIG. 5

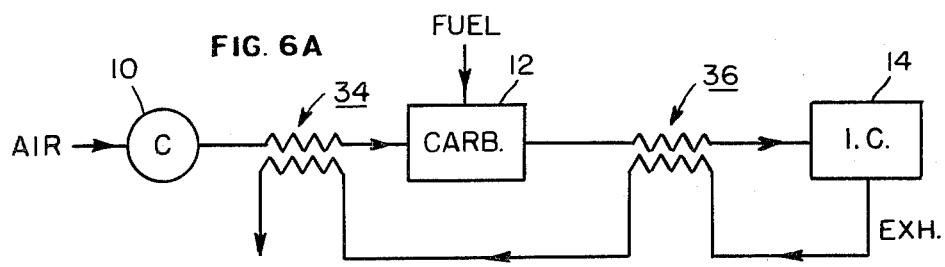
FIG. 6A
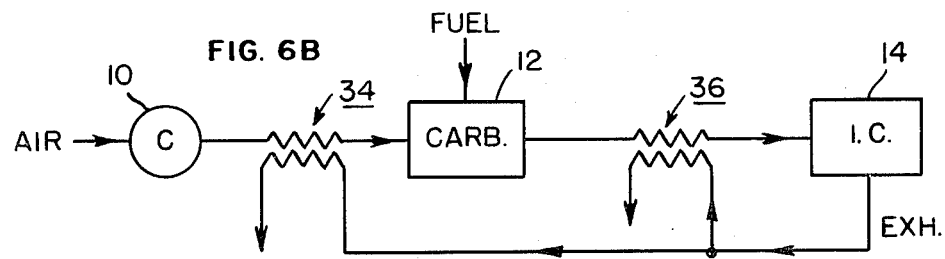
FIG. 6B
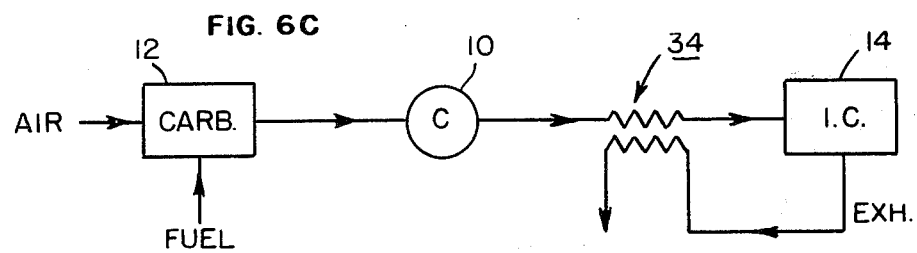
FIG. 6C
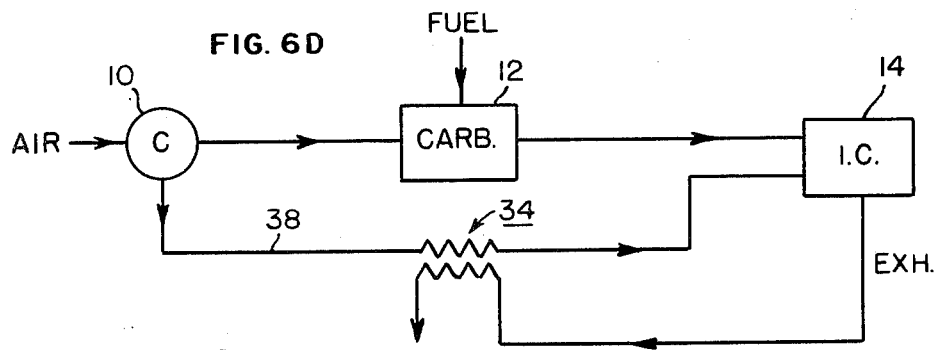
FIG. 6D
FIG. 6

OTTO CYCLE

FIG. 7A — Full Throttle Un-Supercharged

FIG. 7B — Part Throttle Un-Supercharged

FIG. 7C — Supercharged

DIESEL CYCLE

FIG. 8A — Full Throttle Un-Supercharged

FIG. 8B — Part Throttle Un-Supercharged

FIG. 8C — Supercharged

INTERNAL COMBUSTION ENGINE

CROSS-REFERENCE TO RELATED APPLICATIONS

This application is a continuation-in-part of applicant's copending applications: (1) Ser. No. 955,895, filed Oct. 30, 1978, entitled INTERNAL COMBUSTION ENGINE; (2) Ser. No. 955,896, filed Oct. 30, 1978, entitled INTERNAL COMBUSTION ENGINE; (3) Ser. No. 926,237, filed July 20, 1978, entitled VEHICLE BRAKING AND KINETIC ENERGY RECOVERY SYSTEM; (4) Ser. No. 947,998, filed Oct. 2, 1978, entitled HYBRID ENGINE; and (5) Ser. No. 970,320, filed Dec. 18, 1978, entitled INTERNAL COMBUSTION ENGINE.

BACKGROUND OF THE INVENTION

1. Field of the Invention

This invention relates to internal combustion engines wherein most or all of the compression is done outside of the working cylinders, with a variable compression ratio compressor and with direct regeneration of exhaust heat to the compressor outlet gas.

2. Description of the Prior Art

Practical internal combustion engines have three basic functions to perform: (1) Compression of air (or air/fuel mixture or air/fuel/exhaust mixture or air/exhaust gas mixture), (2) provide a combustion process (burning or explosion) of a fuel/oxidizer mixture, and (3) expansion of the hot combustion products against a mechanical device (e.g. piston) to produce useful work. A basic efficiency conflict exists in the three functions. The compression needs to be carried out in a cold chamber but the combustion and expansion functions require a hot chamber (insulated so that valuable heat is not lost to the surroundings).

Gas turbine technology solves this conflict by physically separating the compressor from the burner and from the work expander (turbine). Thus, the compressor can be cooled while the burner and turbine can be insulated.

The early days of engine development were governed by different problems than those of today. Fuel (particularly gasoline) was cheap and plentiful and therefore high efficiency was not essential. Strong materials were not available and the total weight allotted to the engine was comparably small. Thus, the overriding constraint was compactness and total size; this was in direct opposition to the gas turbine approach that spread everything out. The Otto and diesel concepts fit the bill in those early days. Everything was compact such that one working chamber, not three (compressor, burner, expander), was required. The same cylinder was used to compress, burn and expand. A major loss in efficiency results from this concept of a single, multifunction chamber. The compression must be done in a hotter than desired chamber while combustion and expansion must be done in a colder than desired chamber.

Many U.S. patents teach compression external to the working cylinders, see for example: U.S. Pat. Nos. 682,567; 914,566; 1,114,521; 1,305,580; 2,769,435; 2,799,258; 2,873,574; 3,148,668; 4,040,400. If only part of the compression is done externally, the process is called super-charging. If substantially all of the compression is done external to the working cylinders, the previous art teaches additional cylinders in the main engine block reserved for compression only. A portion of the cycle time is allotted to transferring compressed gas from the compression cylinders to the working cylinders. These approaches are not adequate solutions to the problems faced today.

Applicant's copending patent application Ser. No. 970,320, filed Dec. 18, 1978 entitled INTERNAL COMBUSTION ENGINE describes the use of external compression, variable compression ratio, and direct exhaust regeneration in an Otto cycle. An extensive optimization theory is presented in that copending patent application. Prior art (Otto and diesel) cycles do not permit direct regeneration due to the prohibitive penalty in work of compression.

The present invention takes into account the prior art diesel type cycle. The term diesel "type" cycle is used here because the classic concepts and definitions inherent in the terms "Otto" and "diesel" do not accurately and completely describe the present invention nor that of said copending application Ser. No. 970,320, filed Dec. 18, 1978. The present invention presents a more realistic, practical, and accurate model of the unit processes taking place in an internal combustion engine of the type considered here. It is to be understood that the classical Otto and diesel cycles (idealized) extensively analyzed in the literature represent special, degenerate cases of the present model. Applicant's copending patent application Ser. No. 970,320, filed Dec. 18, 1978 analyzes extensively the modified Otto type cycle and the present patent application analyzes the modified diesel type cycle as well as the generalized cycle.

It is an object of the present invention to optimize the design of an internal combustion engine. This includes spark ignition engines, compression ignition engines, exhaust heat ignition engines, and combinations of these.

It is another objective of this invention to greatly improve the efficiency of an internal combustion engine and therefore the mileage of a vehicle using such engine and therefore to greatly reduce oil consumption.

It is another object of this invention to perform most or all of the compression outside of the working cylinder of an internal combustion engine and to vary the compression ratio in response to changes in certain parameters.

It is another object of this invention to provide an internal combustion engine with direct regeneration of exhaust heat.

It is another object of this invention to provide a definite relationship between the compressor output pulsations and the power cycles in the working cylinders. This relation may be cyclic, slowly changing, fixed, controlled, or random (surge tank between compressor and cylinder inlets).

BRIEF SUMMARY OF THE INVENTION

The present invention describes and defines preferred configurations and operating parameters for a generalized cycle internal combustion engine. Fuel can be injected directly, by carburation, or by a combination of both. Ignition can be by spark, compression, pre-heating via exhaust heat, or a combination of the three or any two. Further, all types of fuel and all types of combustion (explosion, fast burning, and slow burning) can be used in various combinations. Thus, the air/fuel mixture can be heated to just below the ignition temperature after compression by heat exchange with the exhaust. A slight additional compression in the working cylinder can then be adequate to start the combustion process.

In addition, the preferred embodiment of the present invention teaches several modifications to standard engine:

(1) Substantially most of the compression is done in a compressor external and out of heat exchange contact with the working cylinder apparatus (hereinafter referred to as the "piston-cylinder-combustion chamber system" and defined to include the piston, cylinder, block, head, valves, etc.).

(2) The compressor has a variable product rate (CFM) and variable compression ratio. Preferably, the compression is done by applicant's variable, controllable, rotary sliding vane compressor described in applicant's copending patent application Ser. Nos. 926,237 and 947,998. The compression ratio and/or the CFM can be changed, during operation, to suit the instantaneous conditions that exist (for example, in response to changes in ambient temperature and throttle demand).

(3) Modifications (1) and (2) above allow the expansion ratio to be different from the compression ratio. This permits full expansion during the power stroke which in turn allows the blow-down loss to be minimized at high throttle settings.

(4) Direct regeneration of heat.

(5) Provide a relationship (including random or no definite relationship) between the compressor output pulsations and the power cycles.

Considerable theoretical material is provided in the present specification for use in understanding the teachings and to establish preferred operating ranges. Multi-stage compression with intercooling and full expansion (minimum blow-down loss) are important features of this invention.

Applicant's following copending patent applications Ser. No. 955,895, filed Oct. 30, 1978, entitled INTERNAL COMBUSTION ENGINE; Ser. No. 955,896, filed Oct. 30, 1978, entitled INTERNAL COMBUSTION ENGINE; Ser. No. 926,237, filed July 20, 1978, entitled VEHICLE BRAKING AND KINETIC ENERGY RECOVERY SYSTEM; Ser. No. 947,998, filed Oct. 2, 1978, entitled HYBRID ENGINE; and Ser. No. 970,320, filed Dec. 18, 1978, entitled INTERNAL COMBUSTION ENGINE respectively are hereby incorporated by reference in this application.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIGS. 4 (4A–4D) and 5, 5A are partly diagrammatic, partly schematic views of several fuel and air injection embodiments according to the present invention;

FIGS. 6 (6A–6D) are partly diagrammatic, partly schematic views of several exhaust heat regeneration embodiments according to the present invention;

DETAILED DESCRIPTION OF THE INVENTION

Figure 1:
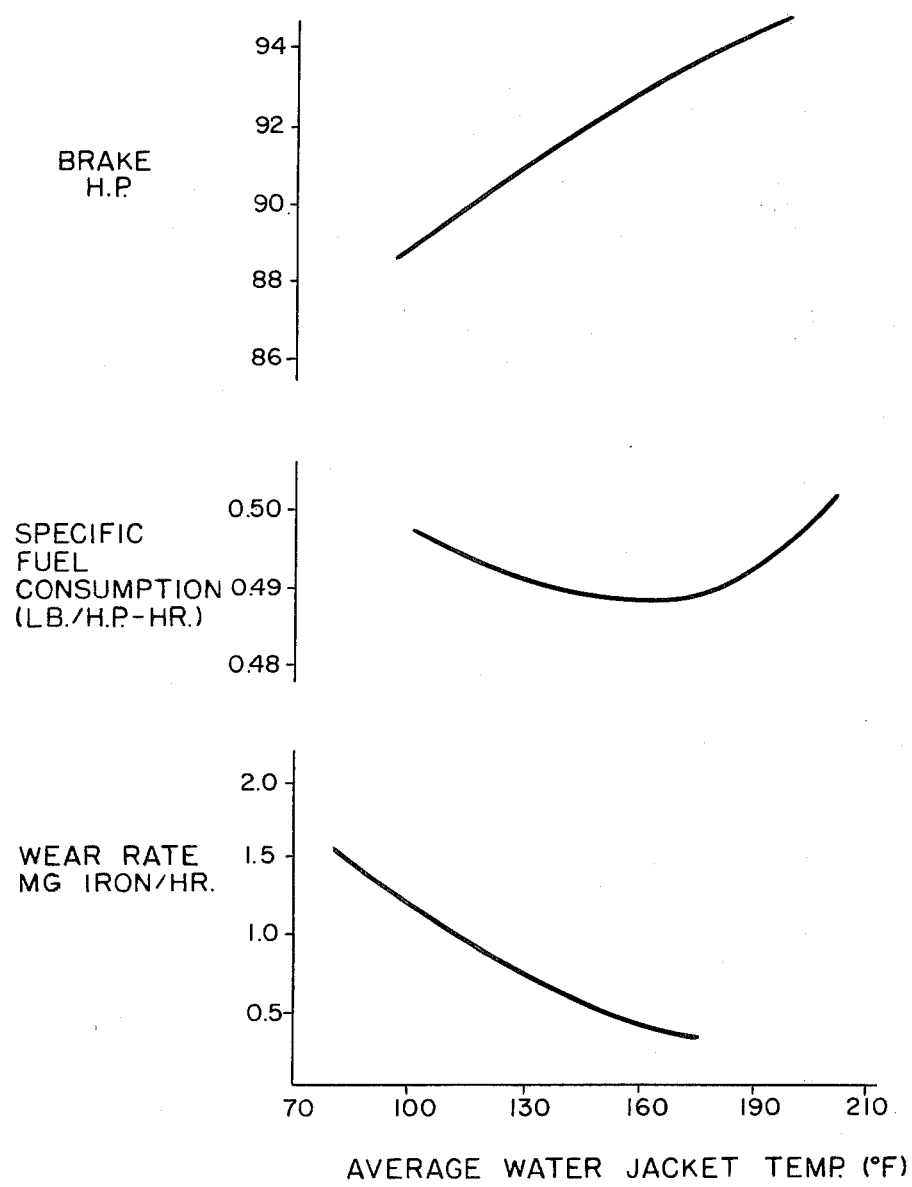
FIG. 1 is a graph showing data typical of today's commercial engines, regarding brake horsepower, fuel consumption, and wear rate versus engine temperature.

The hotter the engine block, the higher the combustion and expansion efficiency in a typical internal combustion engine. This results in higher horsepower at the shaft as illustrated in the top of FIG. 1. However, if this engine temperature is carried too far on the high side, energy becomes wasted due to the extra work required to compress the inlet charge of air (or combinations of air, fuel and exhaust gas). It follows that an optimum engine temperature exists as illustrated in the center trace of FIG. 1. The bottom trace of FIG. 1 serves to illustrate the fact that higher engine temperatures can be tolerated from the wear-erosion viewpoint. In FIG. 1 it is assumed that engine block temperature is directly related to average jacket (or coolant) temperature.

Figure 2:
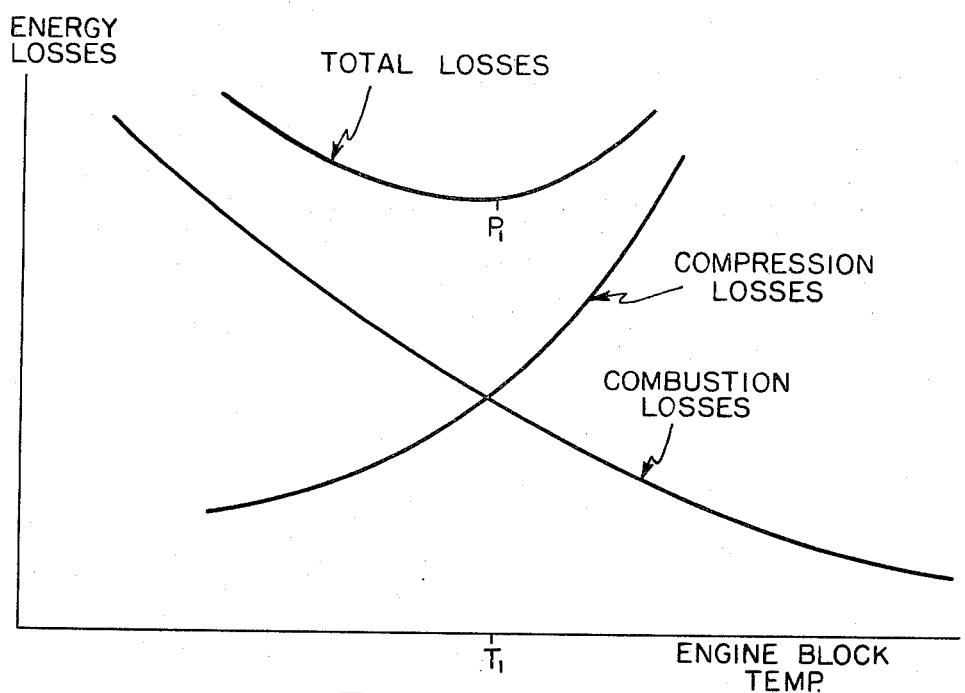
FIGS. 2 and 3 are graphs illustrating combustion, compression, and total engine losses versus engine temperature typical of today's prior art and with improvements taught in the present invention.
Figure 3:
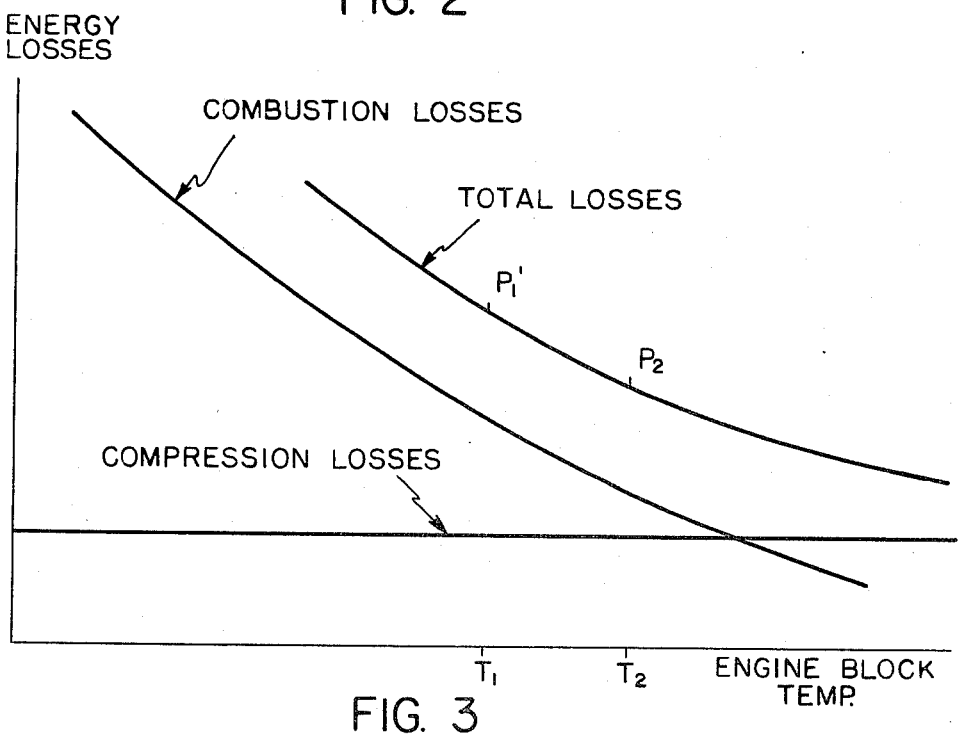

FIGS. 2 and 3 qualitatively explain the optimum operating temperature. The curve in FIG. 2 very clearly illustrates an optimum point at $P_1$ and temperature $T_1$. If, however, the compression is not done in the working cylinder, then the compression energy (loss) does not depend upon engine temperature, as illustrated in FIG. 3 at the bottom. Now, if the engine temperature is moved to the higher value $T_2$ in FIG. 3, the result is a proportionate improvement in the efficiency (see point P$_2$). The following analysis is designed to estimate quantitatively the expected improvements and to define the preferred range of values.

An Otto system is generally associated with a carburetor (although fuel injection has been practiced) and diesel systems generally are associated with fuel injection by pumps and the like. The unique features of the present invention allow hydbrid fuel management systems to be feasible, practical, and desirable. In FIG. 4 we see carburetor arrangements before and after the compressor and in addition, a straight fuel injection scheme. FIG. 4A shows the symbols used in the present application for a compressor 10, a carburetor 12 and an internal combustion engine 14. FIG. 4B shows one embodiment wherein the compressor 10 feeds compressed air to the carburetor where it mixes with the fuel and the compressed air-fuel mixture is then fed to the internal combustion engine 14. FIG. 4C shows the compressor 10 upstream from the carburetor 12, and FIG. 4D shows no carburetor but rather fuel injection via fuel line 16.

FIG. 5 shows more complex fuel management systems involving multiple carburetors and carburetors plus fuel injection. FIG. 5A shows a first carburetor 18 upstream from a compressor 10 and a second carburetor 20 downstream from the compressor. FIG. 5B shows a compressor 22 having a first outlet 26 feeding directly to the internal combustion engine 14 and a second outlet 28 feeding to a carburetor 24 and then to the engine 14. In FIG. 5B, for example, the main inlet of compressed air (from outlet 26) can be such that it is or is not hot enough to cause ignition with the injected fuel in line 30. In the embodiment where it is not hot enough, the piston-cylinder can do a small additional amount of compression sufficient to provide compression ignition. Alternatively, an auxiliary air/fuel mixture simultaneously can be fed to the internal combustion engine 14 through the carburetor 24 and the additional heat can be enough to initiate combustion without a spark. The parallel path fuel input by line 30 can be used, if desired, but such is not essential. Alternatively, the ducts 26 and 28 can be used separately and exclusively, for example, duct 28 can be used with spark ignition and duct 26 together with line 30 and compression ignition.

FIG. 6 shows four embodiments of exhaust heat recovery. FIG. 6A is a generalized case including two heat exchangers 34 and 36, one on each side of the carburetor 12. Either of the two serial heat exchangers 34 and 36 can be deleted, if desired. FIG. 6B shows an embodiment similar to FIG. 6A except that the two heat exchangers 34 and 36 are in parallel. FIG. 6C shows the compressor downstream from the carburetor 12 and of course only a single heat exchanger 34. FIG. 6D shows a parallel path from the compressor 10 to the engine 14 and only a single heat exchanger 34 and that in an air-only duct 38.

Figure 23:
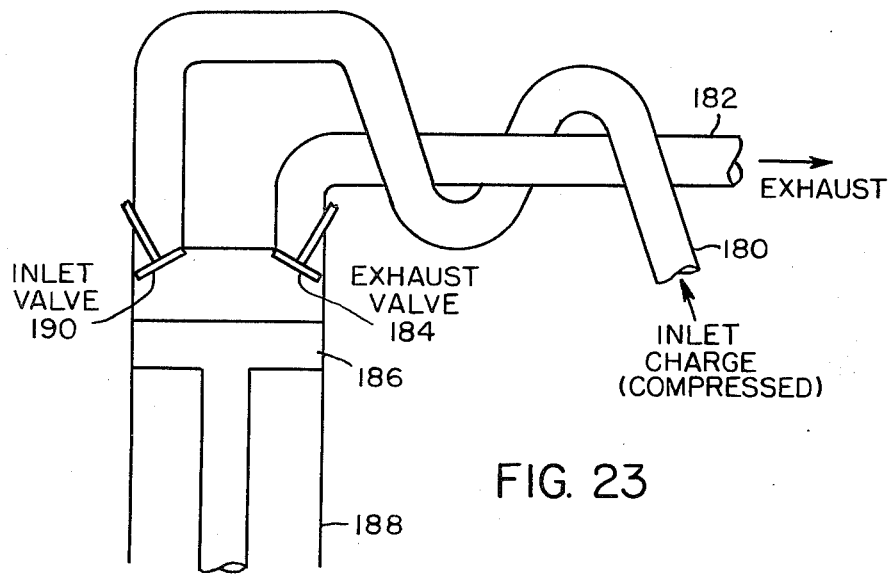
FIG. 23 is a partly diagrammatic, partly schematic view of one embodiment of a heat exchanger according to this invention.

FIG. 23 shows one embodiment of a simple heat exchanger. FIG. 23 shows an inlet duct 180 carrying a compressed gas (such as air or a mixture of air and fuel) and in heat exchange relationship to an exhaust duct 182. FIG. 23 also shows a piston 186, a cylinder 18, an exhaust valve 184 and an inlet valve 190.

Figure 7:
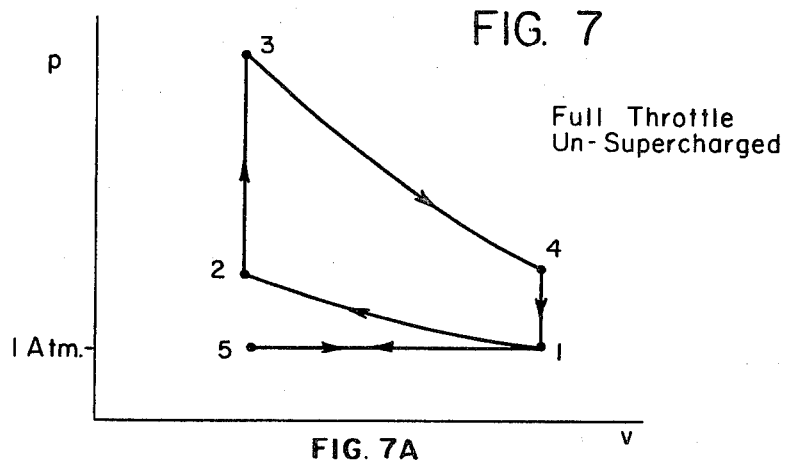
FIGS. 7 (7A–7C) and 8 (8A–8C) are p-v plots for classic Otto and diesel cycles.
Figure 7:
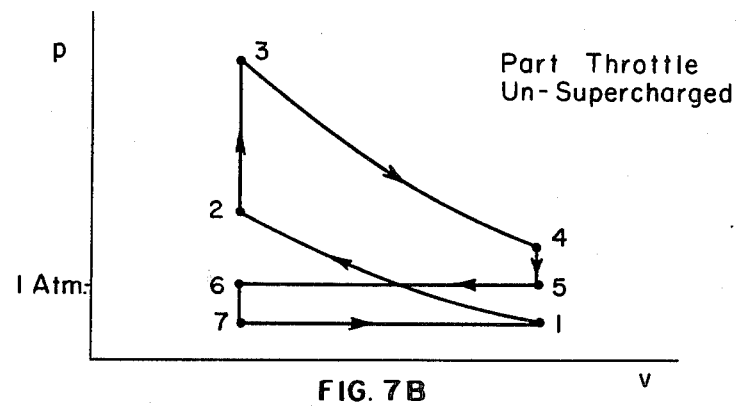
Figure 7:
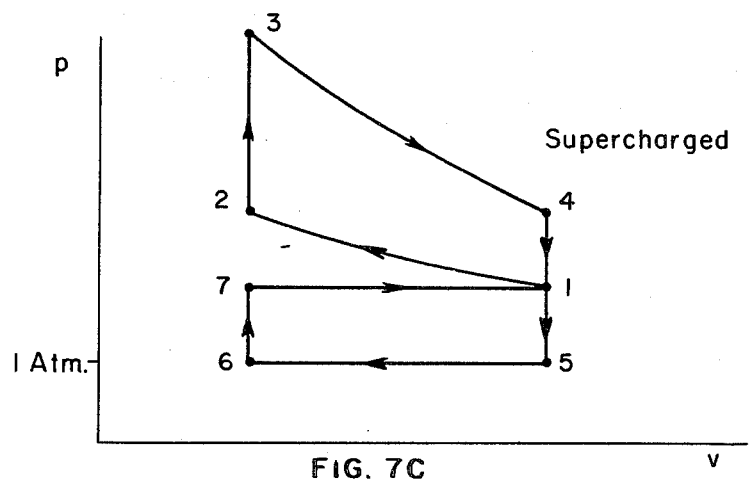
Figure 8:
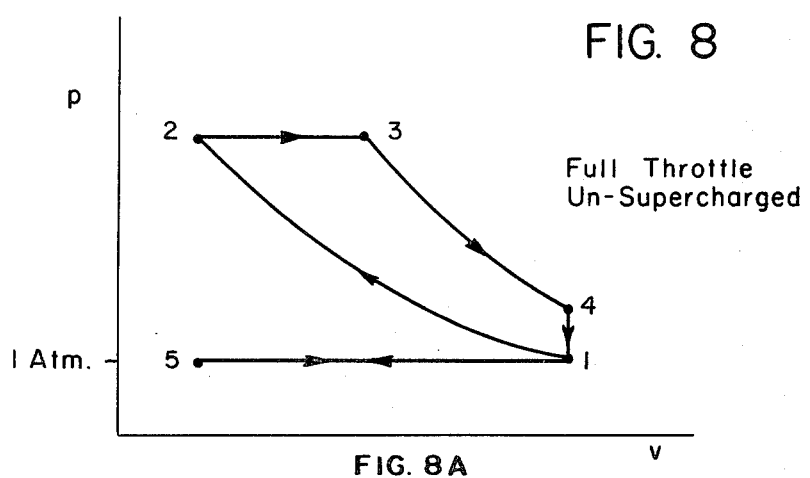
Figure 8:
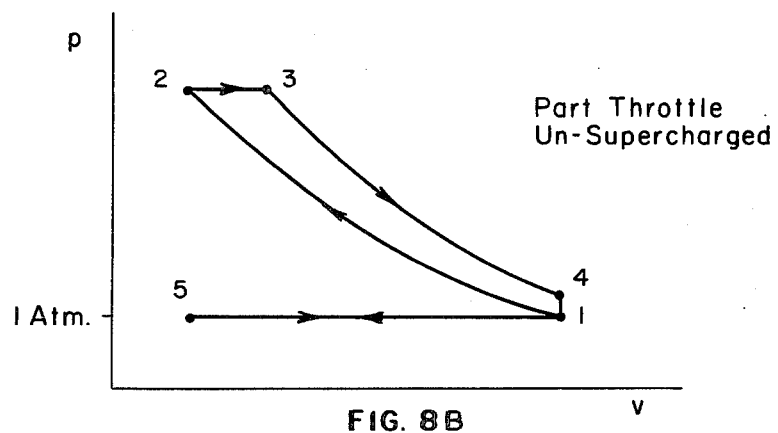
Figure 8:
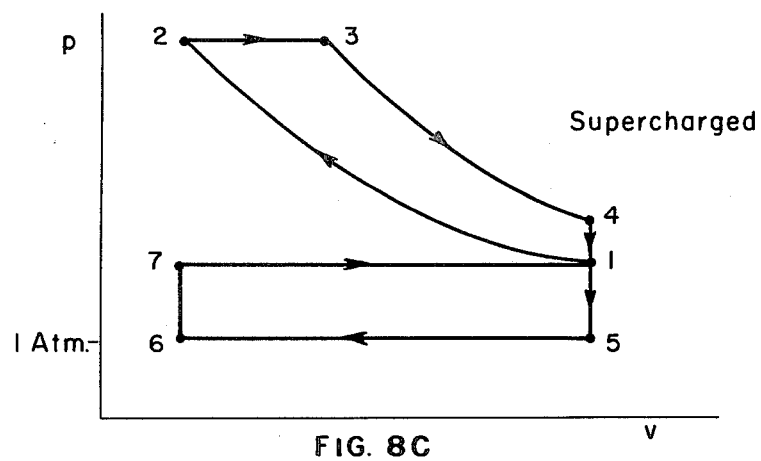

FIG. 7 shows standard p-v plots for a commercial Otto cycle engine and FIG. 8 shows standard p-v plots for a commercial diesel cycle engine. FIGS. 7A and 8A show the full throttle unsupercharged case, FIGS. 7B and 8B show part throttle, and FIG. 7C and 8C show the supercharged case. At reduced throttle for an Otto cycle (FIG. 7B), a pressure drop exists at the carburetor and the cylinder is at less than atmospheric pressure at the instant the inlet valve closes (point 1). This has some advantages and disadvantages. The diesel cycle shown in FIG. 8 illustrates the fact that the diesel is at one atmosphere pressure inlet (point 1) at all throttle settings. The superchanged cases (FIGS. 7C and 8C), of course, raise the inlet pressure to some value above one atmosphere. The constant inlet pressure associated with the diesel cycle at all throttle settings also has advantages and disadvantages.

Figure 9:
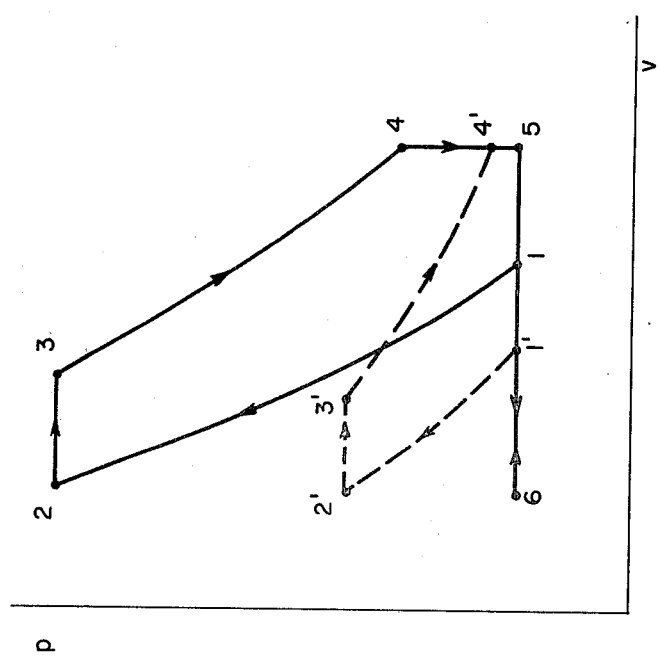
FIG. 9 is a p-v plot for a modified diesel cycle according to one embodiment of the present invention.

The present invention provides new options that have the best features of both of the classic Otto and diesel cycles in regard to inlet air. This is shown in FIG. 9. Since the inlet compressor of the present invention is variable, the pressure at the start of burn (2 and 2$^1$ for two throttle settings) can be made a function of throttle. Thus, the inlet air pressure to the compressor is always fixed (vs. throttle) like in a diesel, yet the air pressure at start of burn can be varied in response to throttle. The high and low throttle settings in FIG. 9 show this point.

Figure 10:
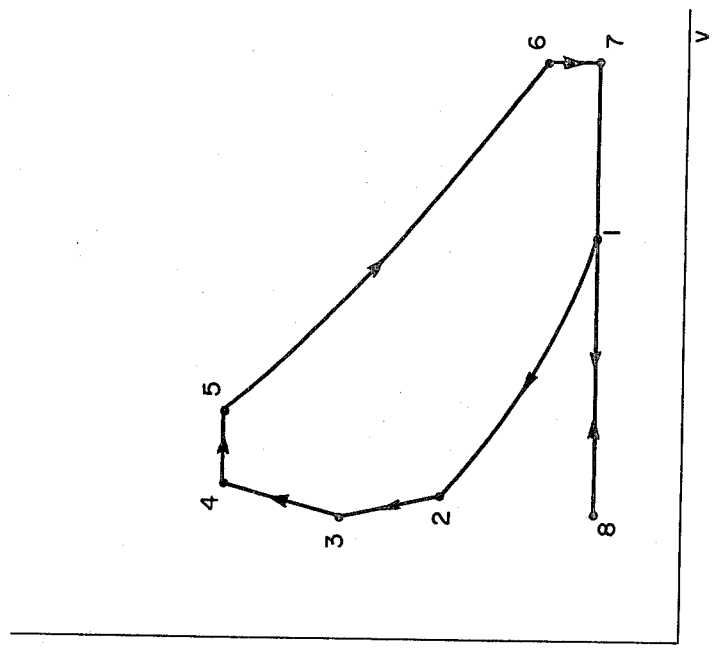
FIG. 10 is a p-v plot for a generalized engine cycle according to another embodiment of this invention.

FIG. 10 shows a general case of the present invention. The energy addition phases (points 2, 3, 4) of FIG. 10 can be by burn, explosion, exhaust heat exchange, and the like. Heat addition is shown to never be quite at constant pressure or at constant volume, exactly.

Figure 22:
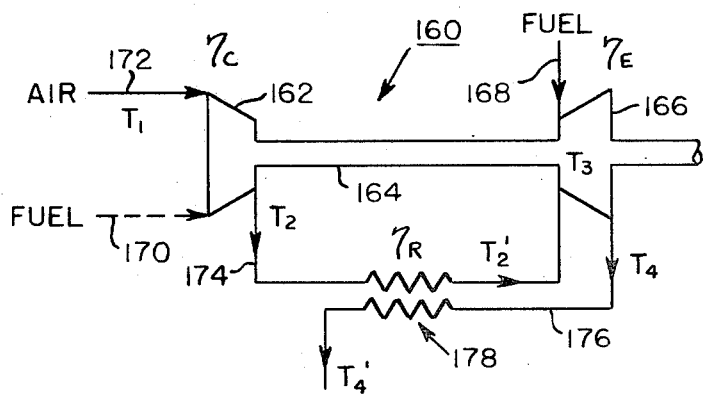
FIG. 22 is a partly diagrammatic, partly schematic view of a modified internal combustion engine according to one embodiment of the present invention utilizing direct regeneration.
Figure 24:
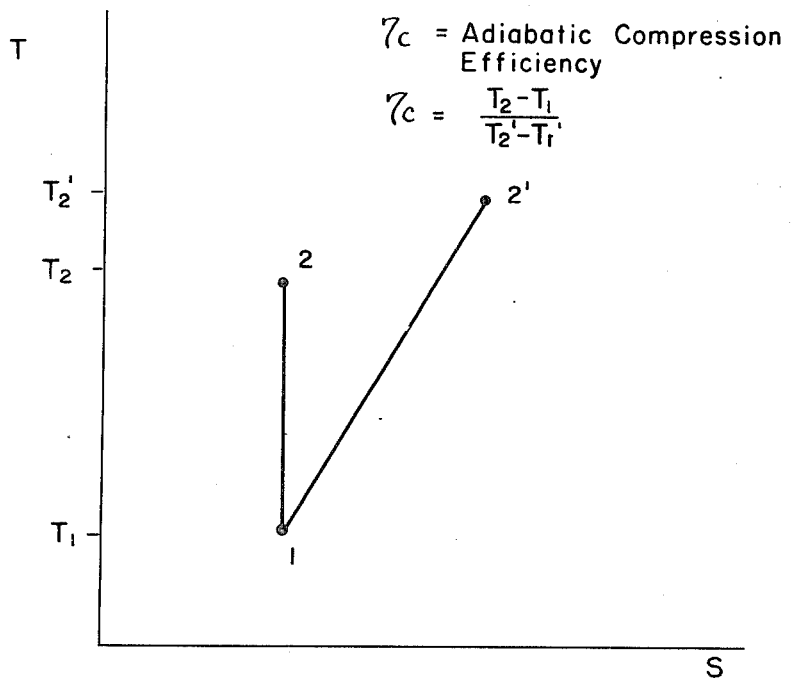
FIG. 24 defines adiabatic compression on a T-s plot.

FIG. 24 defines adiabatic compression on a T-S plot. Some basic theory appropriate to the present invention as related to a diesel type cycle is necessary. The definitions set forth in the table below apply and the standard values used in the specific results are listed. Reference should be had to FIGS. 8 and 22.

FIG. 22 shows a simple block diagram of the gas flow. FIG. 22 schematically and diagrammatically illustrates a modified diesel cycle engine 160 according to this invention. The engine 160 includes a compressor 162 connected to and driven by a shaft 164 driven by an expander 166 (such as the piston-cylinder arrangement in a diesel cycle engine). Fuel is shown in FIG. 22 as fed into the expander by feed line 168 (in one embodiment it can be fed into the compressor at 170). Air is fed into the compressor at 172, compressed air is fed from the compressor 162 to the expander through a duct 174, and the exhaust gas is fed to ambient through duct 176. The air to the expander is heat exchanged with the hot exhaust gas by the heat exchanger 178.

DEFINITIONS THAT APPLY TO ALL FIGURES

Subscripts refer to the corresponding point in FIG. 8.
$T_1 = T_A + \Delta T_1$
$T_1$ = Gas temperature at compressor inlet at valve closure time,
$T_A$ = Ambient temperature,
$\Delta T_1$ = Rise in compressor inlet air due to heating from cylinder subsequent to entry but prior to valve closing
$\eta_R, \eta_C, \eta_E$ = Thermodynamic (adiabatic) effiency of regeneration compression, expansion
$\gamma = C_p/C_v$ = Specific heat ratio
$T_3$ = Temperature of combustion gases at start of expansion (FIG. 8)
$\Gamma_c = V_1/V_2$ = Compression ratio
$\Gamma_p = V_3/V_2$ = Expansion ratio portion at constant pressure (FIG. 8)
$\eta$ = Thermal efficiency of cycle
$Q_{in}$ = Input heat $Q_{rej}$ = Rejected heat
$T_3$ = 4000° F. (4460° F., Abs) used in examples
$\gamma$ = 1.4 in examples
$T_a$ = 70° F. in examples
With the help of FIGS. 8 and 22 the efficiency can be calculated for the diesel-like situation.

$$\tau = \frac{Q_{in} - Q_{rej}}{Q_{in}} = \frac{C_p(T_3 - T_2^1) - C_v(T_4^1 - T_A)}{C_p(T_3 - T_2^1)} = \qquad 1.$$

$$1 - \left[ \frac{T_4^1 - T_A}{\gamma(T_3 - T_2^1)} \right]$$

$$T_1 = T_A + \Delta T_1 \qquad (2)$$

$$T_2/T_1 = \left[ 1 + \frac{1}{\tau_c}(X_c - 1) \right] \qquad 3.$$
$$X_c = Y_c^{\gamma - 1}$$

$$T_4/T_3 = [(1 - \eta_E) + \eta_E(\Gamma_p/\Gamma_c)^{\gamma - 1}] \qquad (4)$$

$$T_2^1 = T_2 + \eta_R(T_4 - T_2) \qquad (5)$$

$$T_4^1 = T_4 - (T_2^1 - T_2) \qquad (6)$$

A thorough derivation of these relations can be found in "Propulsion Systems" by Hosny—University of South Carolina Press—pages 37 to 60.

Figures 11, 12:
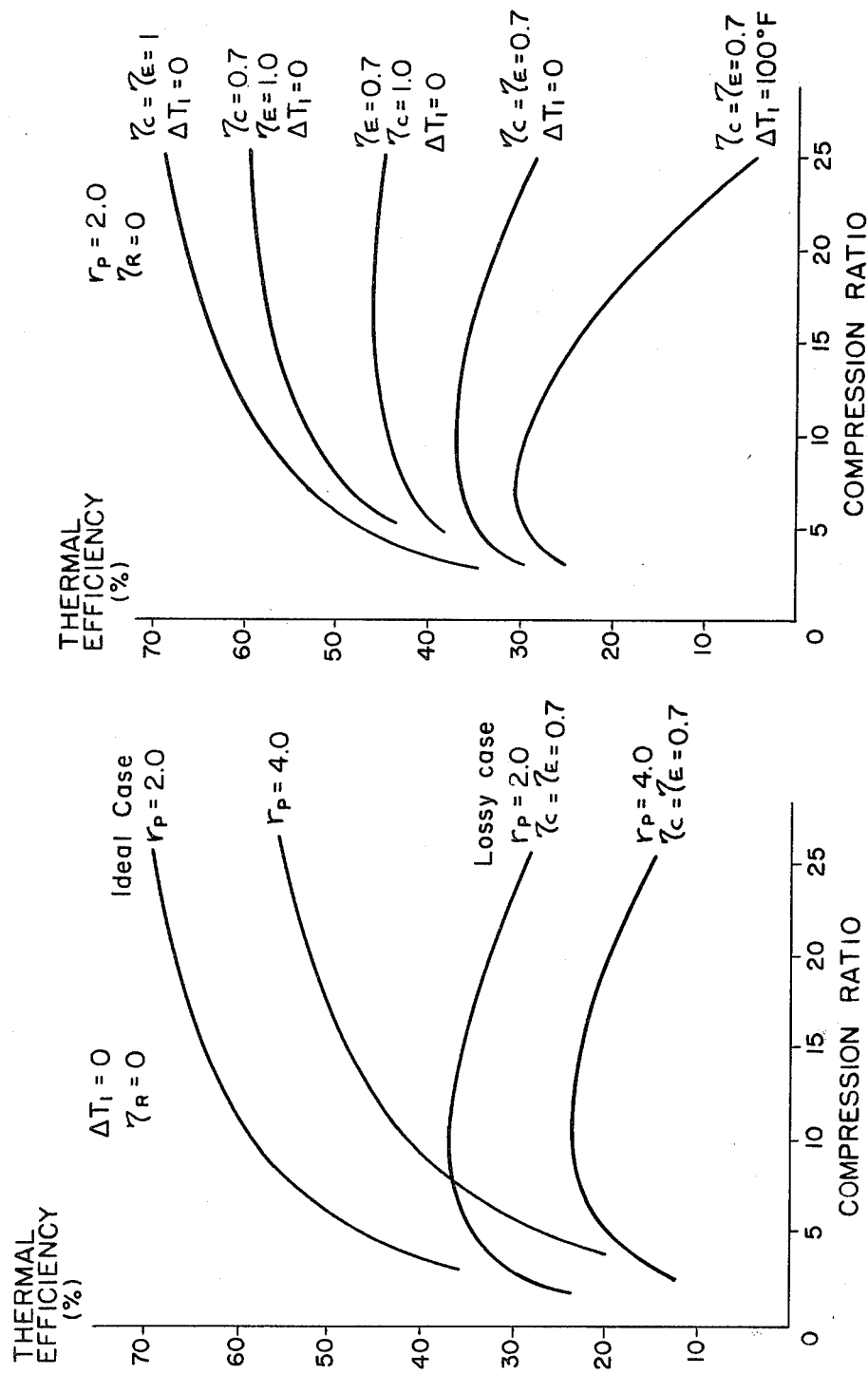
FIG. 11 is a graph of diesel cycle efficiency vs. compression ratio for various losses in components and cut-off ratios.
FIG. 12 is another graph of diesel efficiency with the parameter $\Delta T$ added.

Some typical results for an ideal diesel are plotted as the two top traces in FIG. 11. The classical literature treats only the ideal case and always shows an increase in efficiency with compression ratio. The more accurate analysis of the present invention teaches that thermal losses of compression ($\eta_C$) and expansion ($\eta_E$) cannot be neglected. Indeed, the two bottom traces in FIG. 11 show a reversal of slope and that an optimum exists. In the latest issue of Mark's Mechanical Engineer's Handbook (8th Edition, 1978) on page 9-106 it is stated: "The efficiencies indicated by the air-standard analysis are much higher than can be attained, princially because of variable specific heat, dissociation, and heat and time losses." This, together with the curves indicating increased efficiency with increased compression ratio illustrates the lack of knowledge of this aspect of the present invention.

FIG. 12 presents further efficiency results. The top trace is the ideal diesel cycle again. The second trace shows the effect of lossy compression. The third curve from the top shows the effect of a lossy expansion process ($\eta_E$). The fourth curve shows the simultaneous effects of lossy compression and expansion. The bottom curves show the further effect of $\Delta T_1$. This $\Delta T_1$ represents the heating of the input air in the compression cylinder prior to closure of the inlet valve. The value of $\Delta T_1$ is high for a prior art engine where air compression is done in the hot working cylinder.

The present invention teaches a nearly $\Delta T_1 = 0$ situation. Consider, for example, that the compressor is physically far removed from the hot combustion cylinder (out of heat exchange contact).

Figure 14:
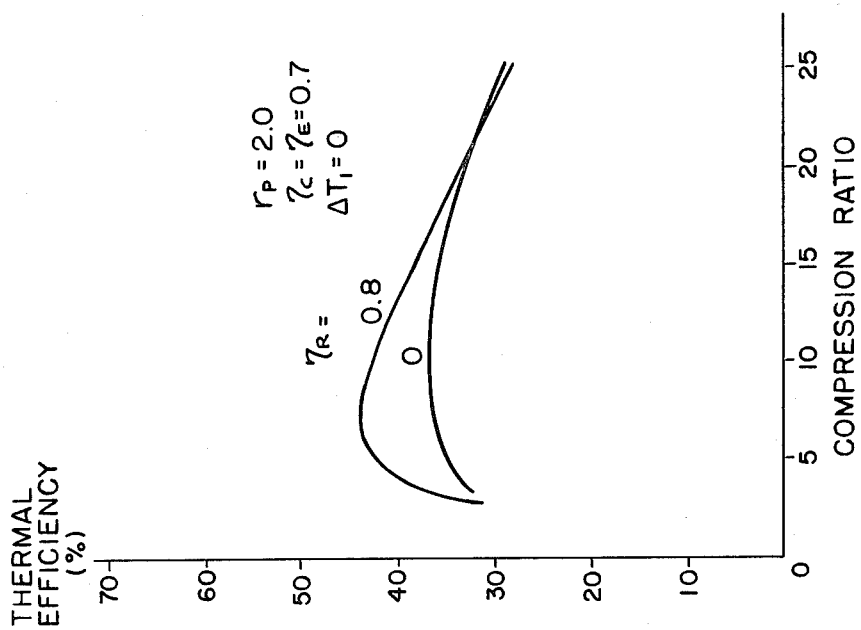
FIGS. 13 and 14 are graphs of thermal efficiency vs. compression ratio showing the effects of exhaust heat regeneration in a diesel cycle.
Figure 13:
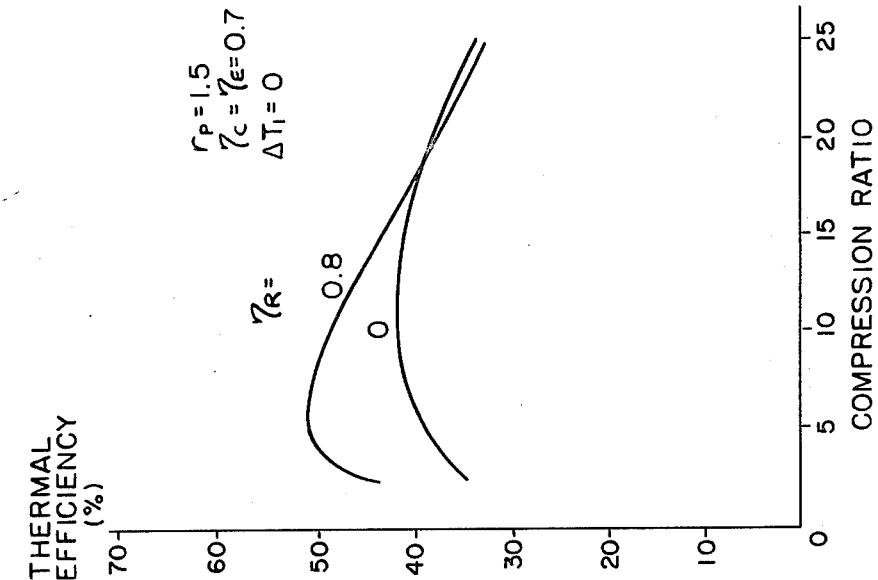

FIGS. 13 and 14 show the benefits upon efficiency of exhaust heat regeneration. As expected, the benefits are greatest at low compression ratios where the compressor outlet air is relatively cool. That is, most heat can be transferred from the exhaust to the compressor output. Two stage compression with intercooling extends the beneficial effects of exhaust regeneration to higher compression ratios.

Figure 15:
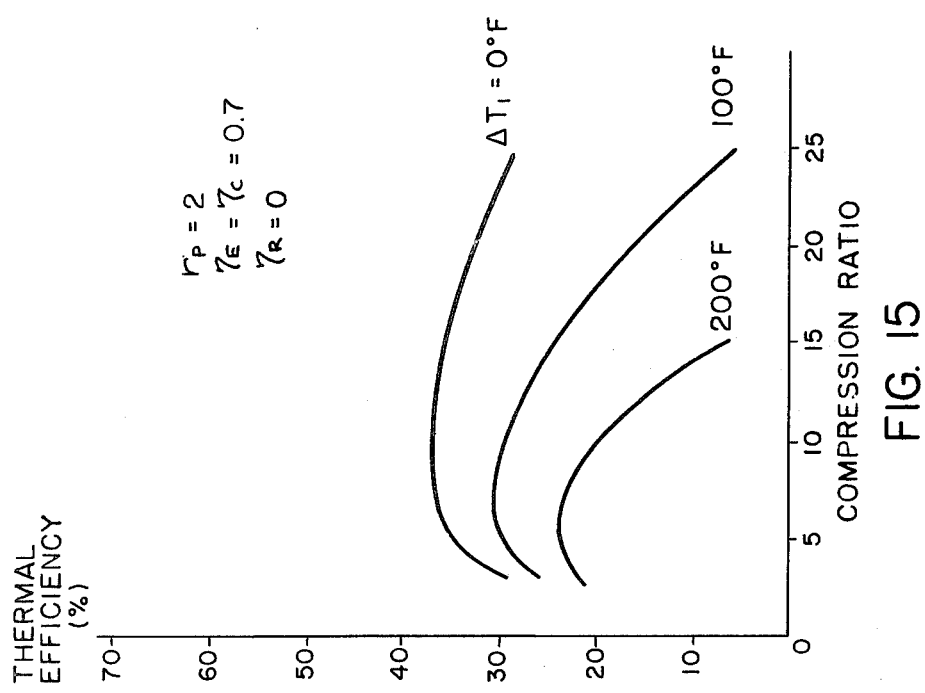
FIG. 15 is a graph of thermal efficiency vs. compression ratio and illustrates the effect of $\Delta T_1$ upon thermal efficiency for a diesel cycle.

FIG. 15 shows thermal efficiency vs. compression ratio for various $\Delta T_1$ values. In general, the present invention corresponds to $\Delta T_1 = 0$ in FIG. 15 and the present day prior art to about $\Delta T_1 = 200°$ F. The exact value of $\Delta T_1$ in a prior art engine depends upon cylinder size (area/volume ratio) as well as degree of cooling, see FIG. 1, for example.

Figure 16:
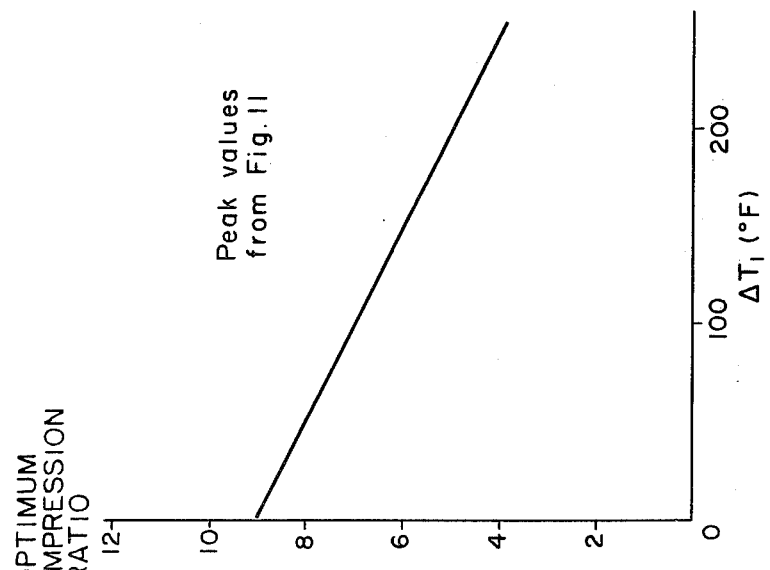
FIGS. 16 and 17 are graphs that illustrate the optimum conditions that occur in FIG. 11.
Figure 17:
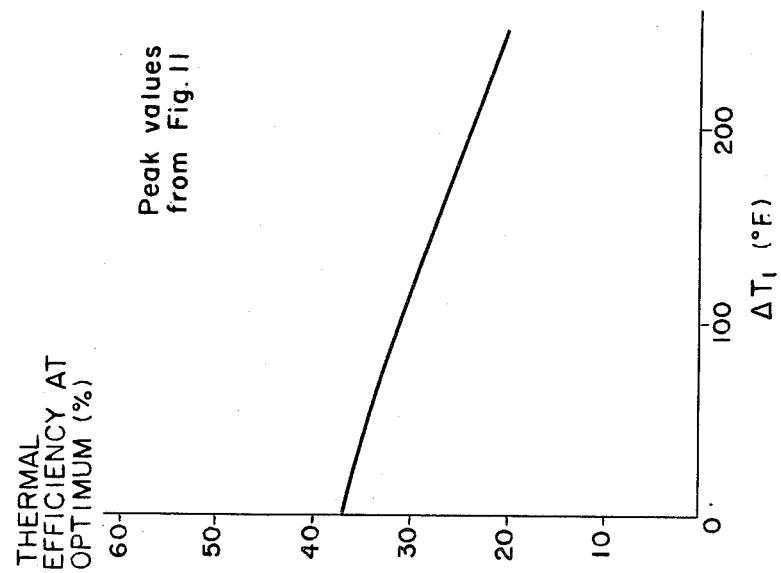

FIG. 16 shows the optimum compression ratio relation in FIG. 15 and FIG. 17 shows the thermal efficiency under optimum conditions in FIG. 15.

Heat regeneration can have beneficial effects other than efficiency. The high compression ratio in a diesel is required in order to achieve ignition. FIG. 15 shows very clearly that the high compression ratios prevalent today (16:1) are accompanied by a reduction in efficiency. Use of exhaust gas heating of the inlet charge is a much more desirable way of approaching ignition temperature than is the brute force compression in use today.

A close look at FIG. 15 in conjunction with applicant's copending patent application Ser. No. 970,320, filed Dec. 18, 1978 entitled INTERNAL COMBUSTION ENGINE shows a curious difference between the teachings of the present invention applied to a diesel vs. applied to an Otto cycle. Lower $\Delta T_1$ (cooler compressor inlet temperature) required somewhat higher compression ratios (at optimum). The reverse was found in the copending patent application Ser. No. 970,320 for the Otto case.

Figure 18:
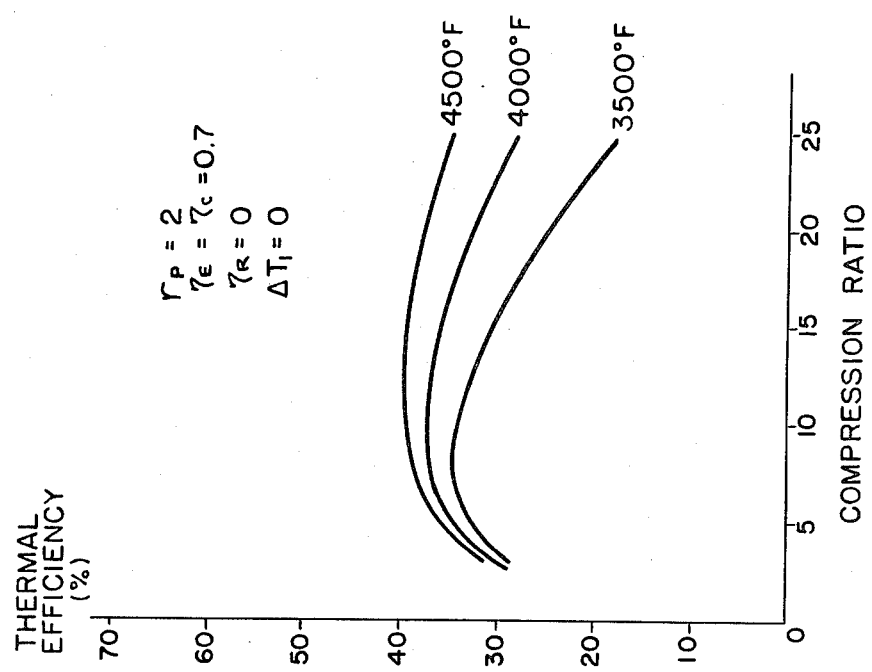
FIG. 18 is a graph of thermal efficiency vs. compression ratio that shows the effect of gas combustion temperature ($T_3$) at the expansion portion of the cycle.

The direct benefits from running the engine hotter can be seen in FIG. 18 for a range of 3500° F. to 4500° F. = $T_3$. The comparison of the present case to the present prior art is summarized in FIG. 19 for the diesel-type cycle. The present prior art is taken to correspond to $T_3 = 3500°$ F. and $\Delta T_1 = 100°$ F. The present invention corresponds more to $T_3 = 4000°$ F. and $\Delta T_1 = 0°$ F. The major improvement in thermal efficiency is clearly noted.

Applicant's copending patent application Ser. No. 970,320 directed towards the Otto cycle teaches substantially all of the compression is done outside the power cylinder. The present case teaches (in one embodiment) that substantially most of the compression is done outside of the power cylinder. Some additional compression may be done in the modified diesel work cylinder of the present invention. This can be desirable in the combustion process at the expense of some efficiency. Consider the following example. A compression (external) of 12:1 at a 70% efficiency raises the air temperature from 70° F. to 1198° F. (equation 3). A further compression of this hot gas by 2:1 raises the temperature to 1858° F. Thus, most (12:1) of the compression can be done efficiently in the external compressor and the final amount (to initiate combustion) of compression (2:1) done inefficiently in the work cylinders. The intermediate gas temperature can be higher by use of exhaust regeneration.

It is understood that additional exhaust energy recovery systems may be used. For example, applicant's copending patent application Ser. No. 957,217 (incorporated herein by reference) teaches recovery of exhaust blow down energy via turbine expansion.

Figure 21:
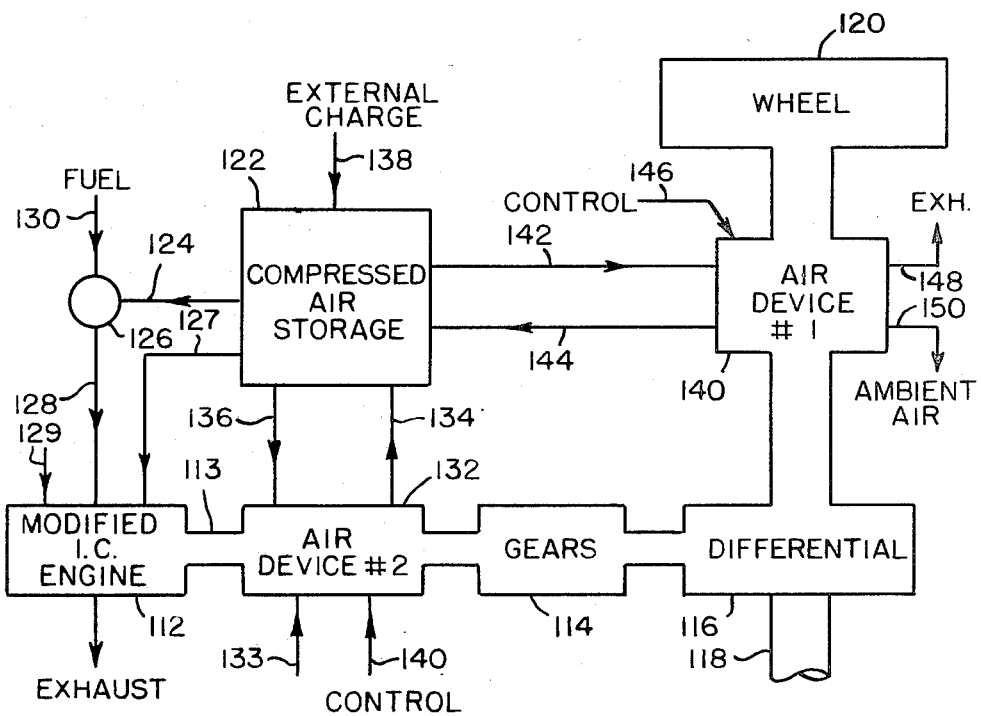
FIG. 21 is a partly diagrammatic, partly schematic view of one embodiment of the present invention.

FIG. 21 relates the present invention to applicant's copending patent application Ser. No. 947,998 in regard to an internal combustion engine - air motor hybrid. FIG. 21 shows an engine system including a modified diesel cycle engine 112 as described in the present application, connected to an output shaft 113, gears 114, a differential 116, an axle 118 and wheels 120 (only one of which is shown). A compressed air storage tank 122 feeds compressed air through conduit 124 to a carburetor 126 where it is mixed with fuel and the mixture fed to the engine 112 through conduit 128. Fuel is fed to the carburetor through line 130. Alternatively, compressed air can be fed directly to the internal combustion engine 112 by a duct 127 and fuel can then be injected (by a line 129) for compression ignition. Two sources of compressed air are shown; one being a compressor 132 connected to the shaft 113 and the other being a compressor 140 connected to the wheel 120 and/or axle 118. Ambient air is fed into the compressor 132 through line 133 and compressed air is then fed into the tank 122 through conduit 134. Provision is made for filling tank 122 from an external source via conduit 138. Conduit 136 can feed compressed air from the tank 122 to the compressor 132 to raise the pressure of the air in the tank 122. Tank 122 can be a plurality of separate tanks. The compressor 140 takes ambient air in through duct 150 compresses it and feeds compressed air to the tank 122 through duct 144. The compressor 140 can also be a motor in which case compressed air can be fed thereto by duct 142 from tank 122 and exhausted by duct 148. The air device 140 can also be a compressor-brake and the kinetic energy of the vehicle can be recovered as compressed air stored in tank 122, as described in applicant's copending patent application Ser. No. 926,237.

As stated above, during acceleration, compressed air can be fed from the tank 122 to the air device 140 which in turn supplies tractive effort to aid the main engine 112. The second air device 132 mounted on the main drive shaft 113 operates in a similar fashion but is a more continuous duty device. That is it must supply the compressed air to the modified diesel engine 112 during normal operation. The control of the compressor 132 can be manual (for example, brake pedal, throttle, etc.) or it can be supplied by a level sensor mounted in the main compressed air tank 122. If the tank 122 is fully charged up, compressor 132 can be controlled to reduce the amount of work done thereby. A major engine advantage gained in this embodiment is that a ready supply of compressed air is always available to the modified diesel engine 112.

The compression ratio can alternatively be controlled by using a standard on-off, non-variable, non-controllable compressor (in place of applicants preferred variable, controllable rotary sliding vane compressor 132) by means of having such standard compressor being either on or off and having it feed a tank (like tank 122) and having the compressed gas flow from such tank be controlled by a simple variable, pressure reducing regulating valve, thus decoupling the modified diesel operation from the compressor operation. Thus, it is not essential to this invention to use a controllable compressor.

Figure 25:
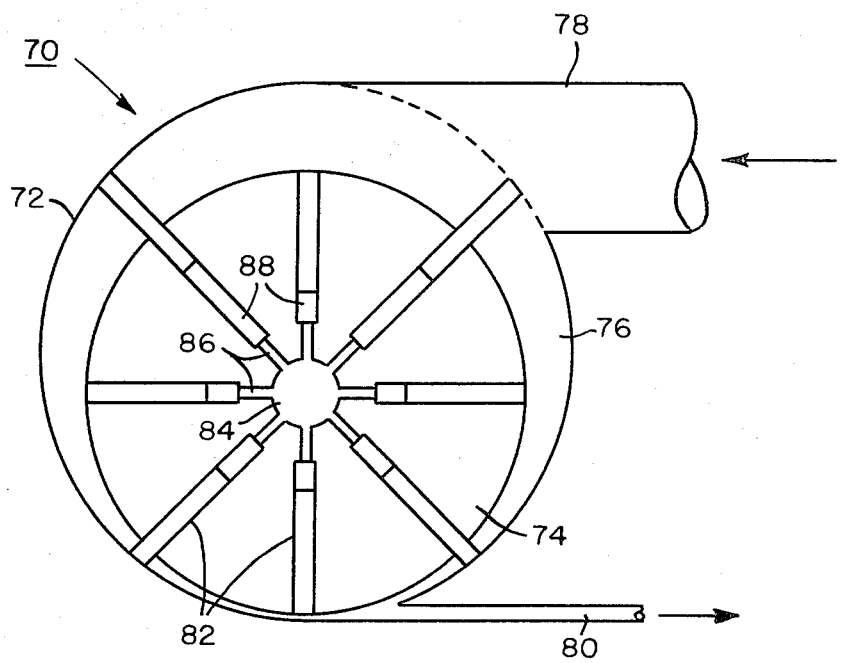
FIG. 25 is a partly diagrammatic, partly schematic side view of one embodiment of the variable, controllable, rotary sliding vane compressor useful in the present invention.

FIG. 25 illustrates one way to control the compression ratio as taught in applicant's copending patent applications Ser. Nos. 926,237 and 947,998. FIG. 25 shows an eight vane compressor 70 including a stator 72, a rotor 74, a chamber 76 therebetween, a plurality (eight) of sliding vanes 82, an air inlet 78 and a compressed air outlet 80. A central air passageway 84 connected to radial passages 86 and chambers 88 beneath the vanes 82 are shown as illustrative of ways to vary or control the vanes 82 and therefore the pressure ratio and flow rate. For details of the control means reference is made to applicant's copending applications Ser. Nos. 926,237 and 947,998. As shown in FIG. 25 every other vane is completely retracted. Tension springs (not shown) of different strengths can be used to hold the vanes 82 in the retracted position against centrifugal force. A moderate air control pressure will force out those vanes 82 with relatively weak springs. A high air control pressure will force out (extend) all vanes 82. FIG. 25 shows one-half of the vanes 82 in the extended position.

Figure 26:
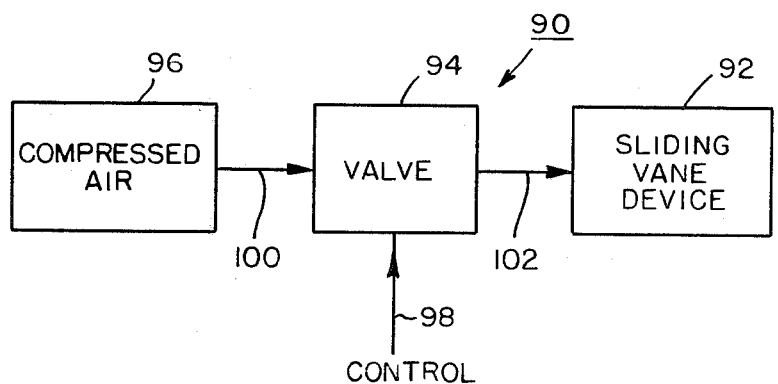
FIG. 26 is a block diagram showing a simple control logic arrangement for the device shown in FIG. 25.

FIG. 26 represents a simple control logic diagram for a rotary sliding vane device 92 (like 70 in FIG. 25). A control signal (throttle linkage, ambient temperature, via a temperature sensor 97, for examle, brake pedal, etc.) is used via control line 98 and valve 94 to port compressed air from a tank 96 to the air device 92 via conduits 100 and 102, and to the passages 86 thereof (FIG. 25). The control valve 94 can be a proportional device and therefore the number of vanes 82 to be activated can be selected in accordance with the previous discussion. The internal combustion engine of this invention can thus have a controlled pressure ratio responsive to various parameters, such as throttle demand, ambient temperature, etc.

FIGS. 25 and 26 show one way to vary the compression ratio (i.e., inlet gas pressure to the working cylinders). This represents one preferred embodiment of the present case. The vanes 82 can be taken out of service or put into service by controlled compressed air applied at the passages 84 and 86, see applicant's copending patent applications Ser. Nos. 926,237 and 947,998.

Figures 19, 20:
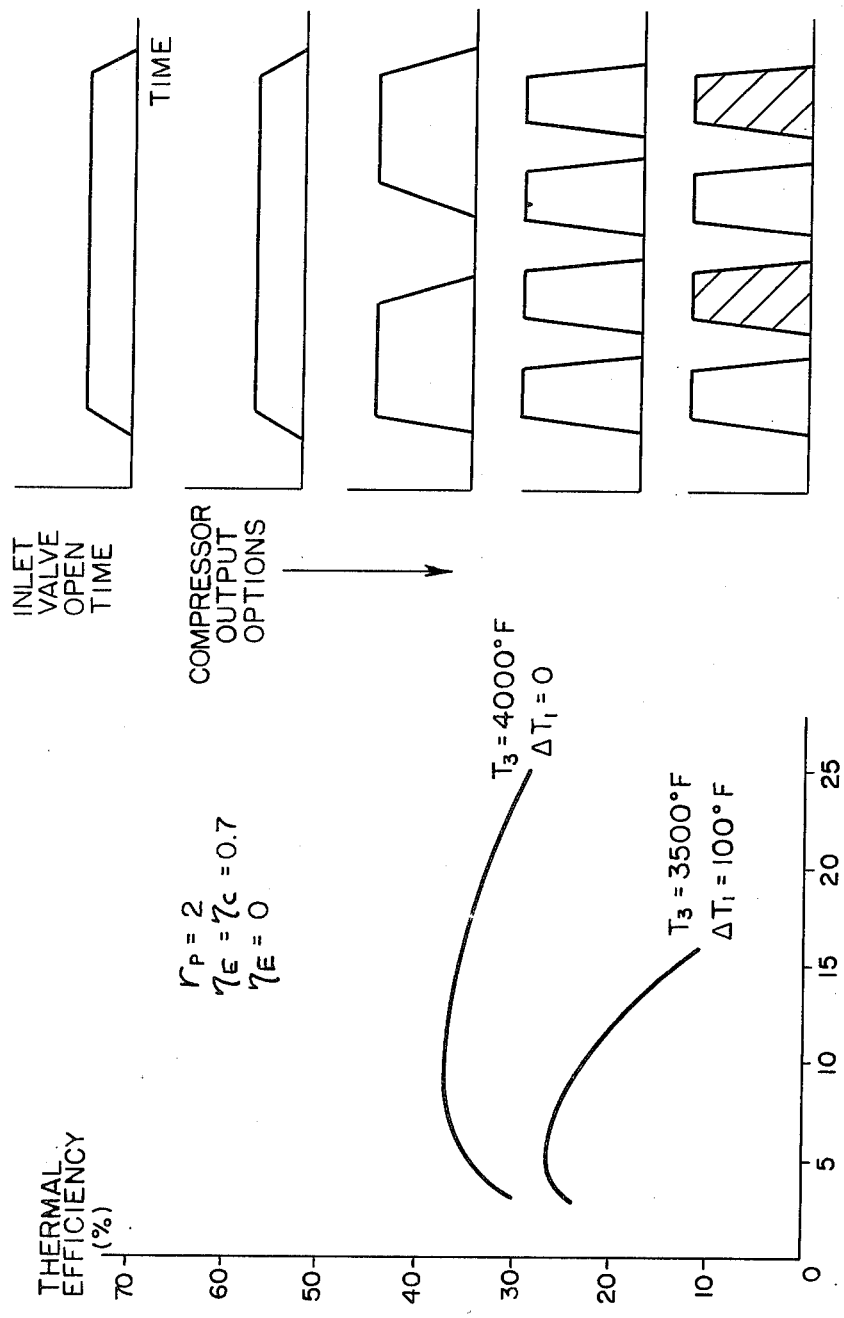
FIG. 19 is a graph of thermal efficiency vs. compression that compares the present invention to the prior art.
FIG. 20 is a graph representing certain compressor output histories as a function of work cylinder inlet valve opening.

There can be a definite relationship between the vane 82 angular position in FIG. 25 and theposition of the piston in the working cylinder. The vane compressor can, for example, be used to charge up an air storage tank. In this case, a random or nonexistant relationship exists between the compressor output and the piston position in the engine. FIG. 20 illustrates the case where a definite relation exists. The top two curves show a 1:1 correspondence, i.e. one vane in the compressor exists for each cylinder and the compressor supplies air for that period when the inlet valve to the combustion chamber is open. The next trace down shows that two pressure pulses are used to charge the cylinder while the inlet valve is open. In this case, the vane compressor must have two vane compression chambers (pie slices in FIG. 25) for each power cylinder. The same is extended to four vanes per piston in the next trace. The bottom trace illustrates the application of this feature to obtain a sort of stratified charge. Every other pulse has fuel mixed with the inlet compressed air to the working cylinder (the cross-hatched areas indicate compressed air plus fuel).

The invention has been described in detail with particular reference to the preferred embodiments thereof, but it will be understood that variations and modifications can be affected within the spirit and scope of the invention as described hereinafter and as defined in the appended claims.

I claim:

1. A method for operating an internal combustion engine having an engine block including at least one combustion chamber comprising:
   (a) compressing air to be fed into said combustion chamber externally of said engine block; in a rotary sliding vane compressor having a pulsed output and matching the pulses thereof with the position of the piston in said cylinder;

(b) maintaining the air being compressed out of heat exchange contact with said engine block during said compressing step;

(c) mixing fuel with the air to be fed into said combustion chamber prior to the below-recited igniting step;

(d) feeding said compressed air into said combustion chamber;

(e) igniting a mixture of fuel and said compressed air in said combustion chamber; and (f) regenerating the heat in the exhaust gas from said combustion chamber by heat exchanging it with said compressed air prior to said step of feeding compressed air to said combustion chamber.

2. The method according to claim 1 including providing two pressure pulses for each charge of said combustion chamber.

3. The method according to claim 1 including providing four pressure pulses for each charge of said combustion chamber.

4. The method according to claim 3 including providing two of said pulses as air-fuel mixtures and two as solely air charges.

5. An apparatus comprising:
(a) an internal combustion engine including at least one piston-cylinder-combustion chamber system;
(b) means for compressing air to be fed into said combustion chamber, said compressing means being separate from said internal combustion engine and out of heat exchange contact therewith, and comprising a rotary sliding vane compressor having a pulsed output and means for matching the pulses thereof with the position of said piston in said cylinder,
(c) means for mixing fuel with air to form an air-fuel mixture to be ignited in said combustion chamber;
(d) means for feeding compressed air from said compressor into said combustion chamber;
(e) means for igniting an air-fuel mixture in said combustion chamber;
(f) exhaust duct means for feeding hot exhaust gas from said combustion chamber; and
(g) means for regenerating the heat in the hot exhaust gas from said combustion chamber including at least one heat exchanger between said exhaust duct means and said compressed air feeding means.

6. The apparatus according to claim 5 including means for providing two pressure pulses from said compressor for each charge in said combustion chamber.

7. The apparatus according to claim 5 including means for providing four pressure pulses for each charge in said combustion chamber.

8. The apparatus according to claim 7 including means for providing two of said four pulses as air-fuel mixtures and the remaining two of said four pulses solely as air charges.

* * * * *